United States Patent [19]
Grillot

[11] 3,763,639
[45] Oct. 9, 1973

[54] SICKLE BAR MOWER HAVING A SWASH PLATE DRIVE

[75] Inventor: Homer N. Grillot, Naperville, Ill.

[73] Assignee: International Harvester Company, Chicago, Ill.

[22] Filed: Nov. 15, 1972

[21] Appl. No.: 306,663

[52] U.S. Cl. .................................. 56/296, 74/60
[51] Int. Cl. ........................................ A01d 55/02
[58] Field of Search ................ 56/296, 297; 74/60

[56] References Cited
UNITED STATES PATENTS

| | | | |
|---|---|---|---|
| 2,149,321 | 3/1939 | Taylor et al. | 74/60 |
| 2,258,517 | 10/1941 | Rose | 56/296 |
| 2,335,415 | 11/1943 | Holmes | 74/60 |
| 2,824,416 | 2/1958 | Orelind | 56/296 |
| 2,835,133 | 5/1958 | Rogers et al. | 74/60 |
| 3,104,511 | 9/1963 | Clark | 56/296 |
| 3,397,584 | 8/1968 | Koch | 74/60 |
| 3,648,444 | 3/1972 | Dunn | 56/296 |

Primary Examiner—Russel R. Kinsey
Attorney—Floyd B. Harman et al.

[57] ABSTRACT

A mower having a transverse mower bar with forwardly projecting cutting fingers shearingly cooperating with cutting knives of a sickle reciprocal thereon. The sickle is oscillated by a novel drive which incorporates an adjustable swash plate driven by a horizontal power input shaft which comprises an adjustable swash plate clamping assembly arranged diagonally with respect to the axis of rotation of the input shaft and embraces the swash plate which is pivoted on a horizontal axis to a yoke of a vertical output shaft which has an arm moving in a horizontal arcuate path and connected to one end of the sickle.

9 Claims, 4 Drawing Figures

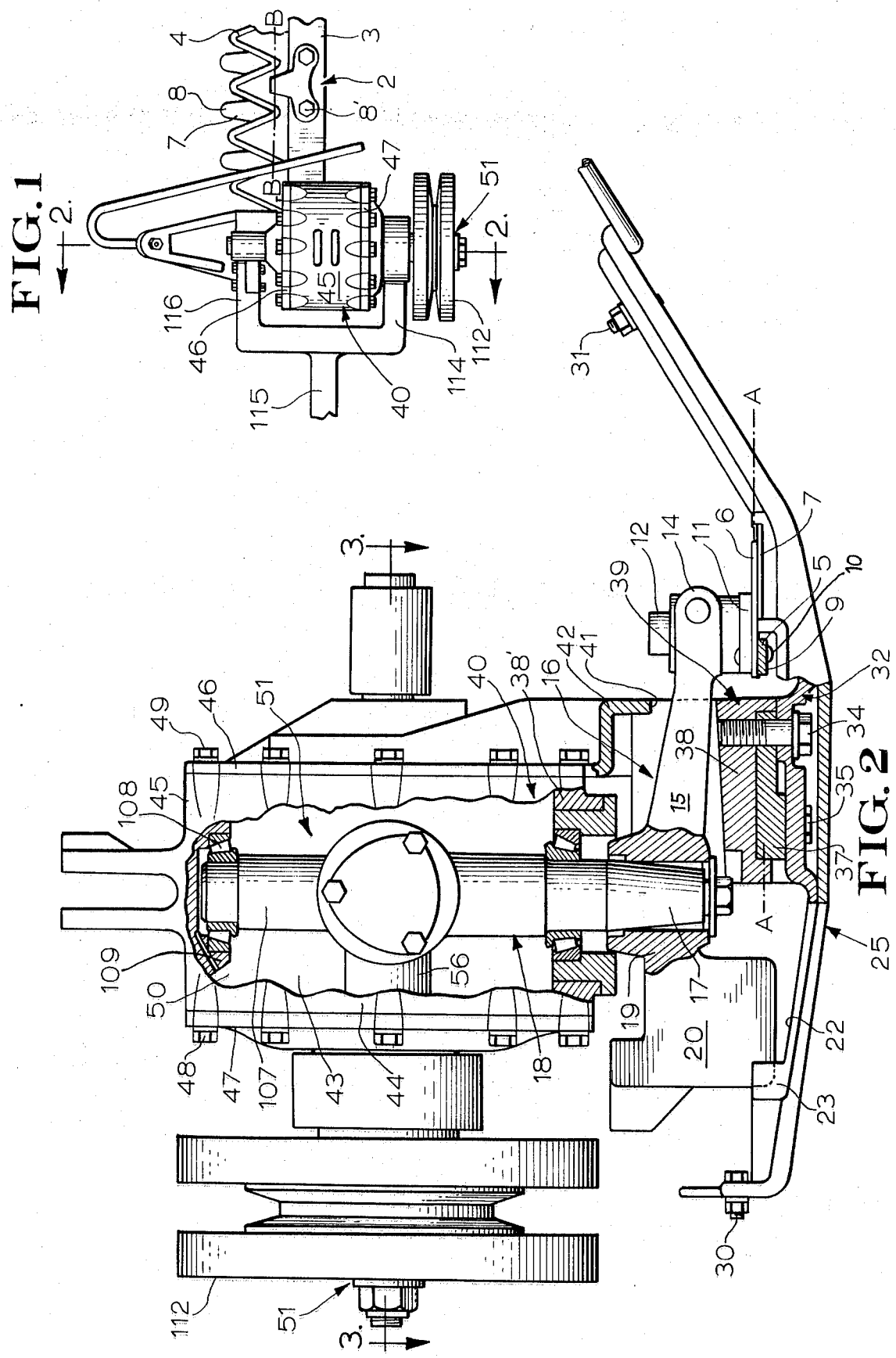

SICKLE BAR MOWER HAVING A SWASH PLATE DRIVE

DISCUSSION OF THE PRIOR ART

In the prior art, the most notable structure which has achieved great commercial success is that shown in U. S. Pat. No. 2,824,416 and marketed by the International Harvester Company as the No. 100 series of Balanced Mowers. These mowers have gained popularity throughout the years and operate effectively. The problems of such mower drive has been cost, and the criticality of maintaining extremely close tolerances. It is absolutely necessary to balance the input shaft at the flywheel, and to coincide with axis of the input shaft with the axis of the wobble and the axis of the vertical output shaft in a common point. Even minor misalignments may not be tolerated since the parts are all fixed in bearings to move on their specified axes and thus even minimal misalignments measured in thousandths of an inch would either bind the mechanism or would prematurely fatigue the bearings and/or the shafts etc.

SUMMARY OF THE INVENTION

This invention is concerned with a drive for a mower which retains the desirable characteristics of a wobble drive and essentially eliminates the undesirable characteristics.

A more specific object is to provide a novel mower drive in which a swash plate assembly is utilized comprising input and output swash plates which accommodate misalignment of the axis of the input shaft, the output shaft and the swash plate pivot by permitting relative eccentric motion between the input and output components.

A further object is to provide a novel drive assembly in which the output swash plate component is clamped between a pair of power input swash plates and power is delivered to the output plate through intervening thrust bearings, the input plates providing a force couple against opposite sides of the output plate at diametrically spaced areas with respect to the axis of rotation of the input shaft with which the input plates are constrained to rotate and capable of sliding movement radially upon the output plate to compensate for any misalignment between the three axes, that is the axis of the input shaft, the pivot axis of the output swash plate with reference to the output shaft and the axis of oscillation of the output shaft.

A different object is to provide an adjustable swash plate assembly wherein parts are individually positionable to provide a proper mating relationship without the necessity of extremely critical accuracy in machines and facing the parts.

Another object is to provide a swash plate drive which is relatively inexpensive to manufacture and which eliminates for the most part the criticality of exact alignment of the power transfer components of the motion converting device.

A still further object is to provide a swash plate drive for a reciprocating mower, wherein the drive is immersed in a lubricant contained in an enclosed housing and wherein the lubricant serves to dampen the peaks of the reversal of movement of the sickle element.

These and other objects and advantages inherent in and encompassed by the invention will become more readily apparent from the specifications and the drawings, wherein:

FIG. 1 is a fragmentary top plan view of a sickle bar mower incorporating the invention;

FIG. 2 is an enlarged vertical sectional view taken substantially on line 2—2 of FIG. 1;

DESCRIPTION OF THE INVENTION

Figure 3:
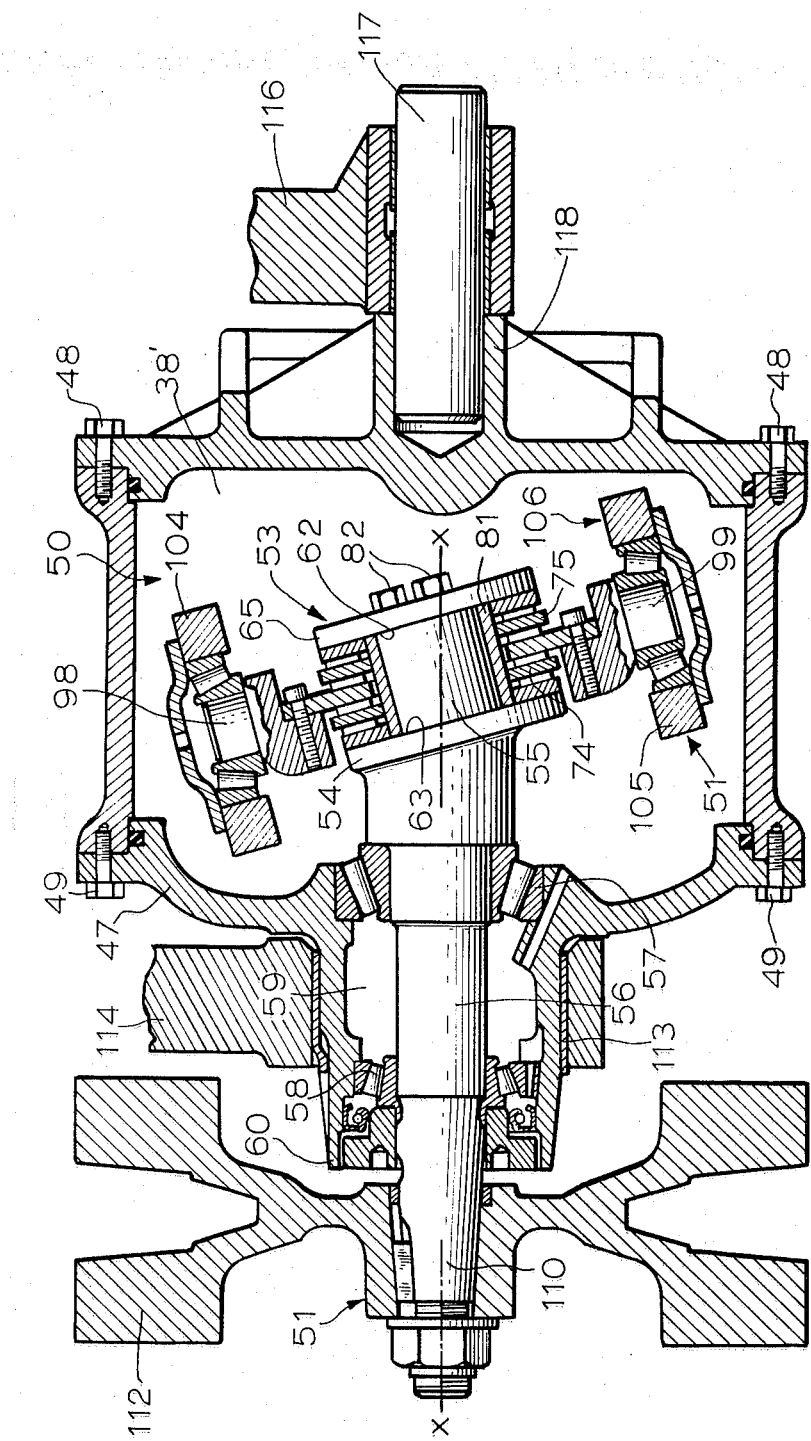
FIG. 3 is a horizontal sectional view taken substantially on line 3—3 of FIG. 2.

Describing the invention in detail, there is shown essentially a conventional mower generally indicated 2 which comprises a mower bar 3 on which is mounted for reciprocation a conventional sickle 4 for operation in a generally horizontal plane indicated A—A in FIG. 2 and on a given line indicated B—B in FIG. 1, the line, of course, being in the plane A—A. The sickle comprises a conventional backing bar on backbone 5 with knives 6 connected thereto which cooperate with the ledger plates 7 which are mounted on the fingers 8 which are suitably connected as by bolts 8' to the cutter bar 3 and form part thereof as will be readily understood by those skilled in the art.

The stubbleward end 9 of the sickle 4 is connected by its backbone 5 as by rivets 10 to a knife-head 11 to which there is journaled a vertical pin or pivot member 12 which is fixed in an opening in the forward end portion 14 of an output arm 15 of the sickle drive mechanism generally designated 16.

The arm 15 is connected with an upstanding lower shaft portion 17 of an output member generally indicated 18. The arm 15 has a rearwardly extending rear arm portion 19 which extends diametrically opposite to the forward end portion 14 and at its rearward end is provided with a counterweight 20. The counterweight as will be readily seen from a consideration of FIG. 2 is a compact mass and is formed and arranged to have its center of gravity spaced diametrically opposite to the center of the pivot member 12 with respect to the vertical axis of oscillation of the member 18. The counterweight is preferably confined within a pocket 22 formed by upstanding peripheral flange 23 which extends from an inner shoe structure generally designated 32 which is secured to the foundation or sole plate structure generally indicated 25 (FIG. 2) by bolts 30 and 31. It will be seen that the inner shoe structure 32 overlies the sole plate structure 25 and intermediate its ends is fastened as by bolts 34 and 35 to the inner or stubbleward end portion 37 of the cutter bar 3 and also to the bottom transverse web 38 of the basic portion or section 39 of the housing generally indicated 40. Housing 40 which encloses drive member 18 has a forward opening 41 formed in forward wall 42 for accommodating the extension of output arm 15. The housing in addition to a transverse intermediate wall 38' comprises inboard and outboard walls 43 and 44 and a top wall indicated 45. Front and rear cover plates 46 and 47 are bolted as at 48 and 49 respectively to the front and rear edges of the top and intermediate side walls of the casing to provide an enclosure compartment 50 for the motion converting drive mechanism 51.

The drive mechanism 51 comprises motion converting means generally indicated 53 which comprises a flange or shoulder 54 integral with the inner end of an inner end portion 55 of a horizontal input shaft 56 which is mounted intermediate its ends for rotation in bearings 57, 58 which are fitted into opposed ends of a bore 59 of an integral journal sleeve 60 extending outwardly from the rear cover member 47. The inner end portion 55 of the input shaft is laterally angled and provides an internal end surface 62 which is parallel with thrust face 63 on the shoulder 54, said thrust face 63 extending transversely of the axis of rotation X—X (FIG. 3) of the shaft 56 at a non-normal angle thereto of between 30° to 45°.

The surface 62 opposes the center portion of a reaction disk or plate element 65 which provides an internal thrust surface 66 parallel with the shoulder face 63. Annular flat wear plates 67, 68 seat upon surfaces 63, 66 and provide opposing parallel thrust faces 70, 71 which are parallel with faces 63, 66. Faces 70, 71 provide slide surfaces for the external sides 72, 73 of thrust bearings 74, 75 respectively. The sides 76, 77 of these bearings 74, 75 engage opposite sides 76', 77' of a swash plate 78 disposed therebetween. The wear plates or disks 67, 68 are provided with center apertures 79, 80, respectively which snugly receive opposite ends of a positioning sleeve 81 which is complementally fitted onto the cylindrical peripheral surface 82 of the inner end portion 55 of the input shaft. The sleeve 81 is slightly shorter than the length of said portion 55 so that the element 65 is spaced therefrom and from the end face 62 and is selectively adjustable against the thrust bearing assemblies 74, 75 and controls preloading against the opposing surfaces 63, 76 and 66, 77 so that in addition to rolling, the bearing assemblies may slide or move eccentrically with respect to the center axis of the swash plate 78 which has a center aperture 83 oversize with respect to the sleeve 81. The reaction disk 65 is bolted to the end portion of the shaft by three bolts 82, which are threaded in apertures 82'. The torque on these bolts 82 determines the loading on the parts clamped between the reaction element and the shoulders.

Figure 4:
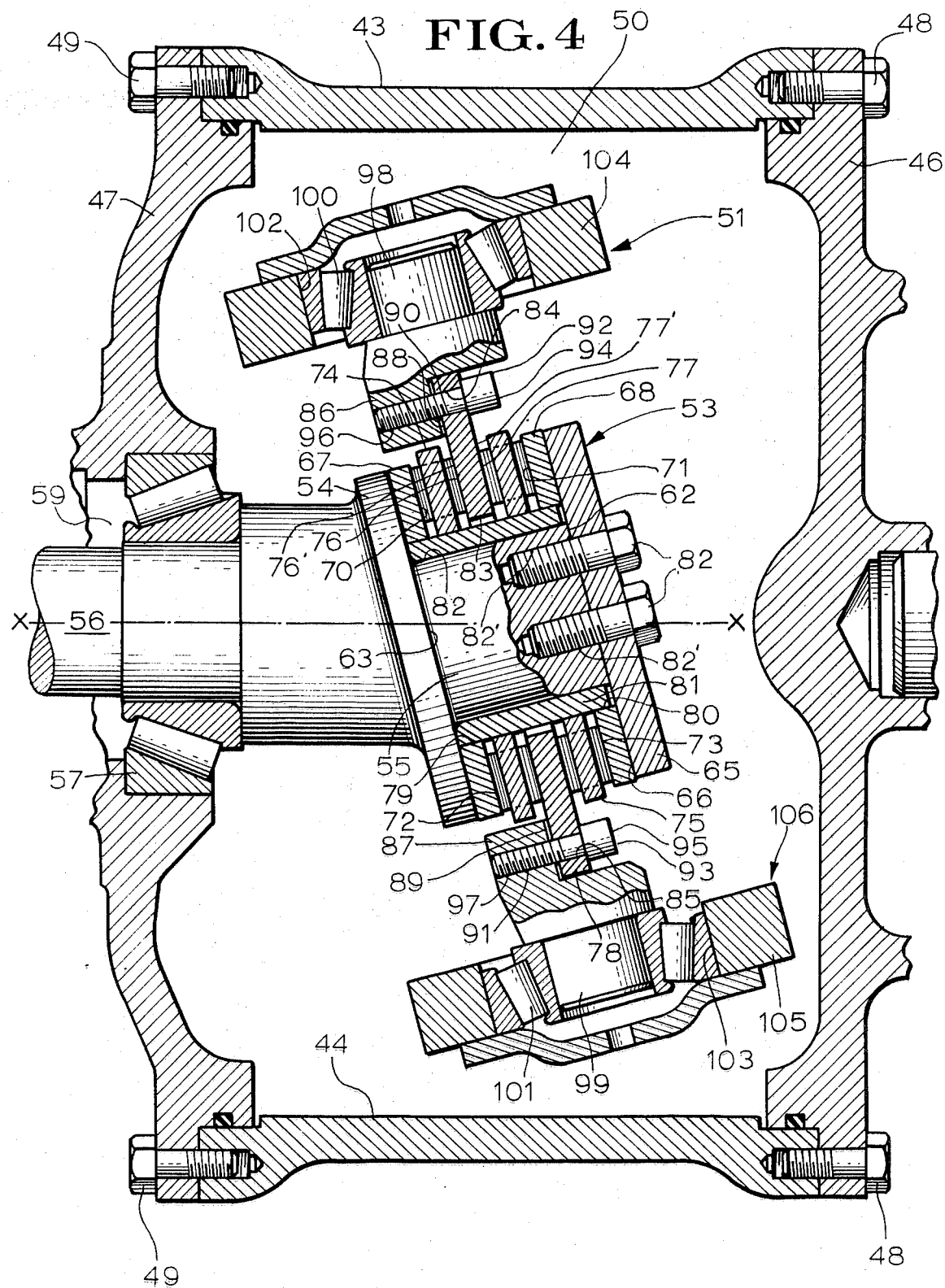
FIG. 4 is an enlargement of a portion of FIG. 3.

The swash plate 78 is provided with transverse apertures 84, 85 (FIG. 4) at diametrically opposite sides and thereat seats upon pads 86, 87 and is secured by shank portions 90, 91 of bolts 92, 93, the bolts having heads 94, 95, respectively which seat against the exposed side of the plate 78 and the threaded shanks are threaded into threaded apertures 96, 97 in the respective pads which are integral with journal pins or pivots 98, 99 respectively. The pivots 98, 99 for the swash plate are located on an axis transverse to the input shaft. The pivots 98, 99 are mounted on bearings 100, 101 which are located in aligned openings 102, 103 in arms 104, 105 of a yoke 106 which is integral with the lower shaft portion 17 of the output member 18.

The output member yoke 106 comprises a generally annular structure which is connected at its upper end to an upper shaft portion 107 which is mounted in a bearing 108, the bearing 108 being fitted into a cup 109 which is formed on the underside of the top wall of the housing or case.

It will be noted that the swash plate 78 may be adjusted transversely with respect to the journal pads to obtain proper mating relation with the thrust bearings and parallelism with the opposing surfaces by removing or adding necessary shims 88 and/or 89 between the pads 86 and 87 respectively and plate 78.

The external end portion 110 of the input shaft is keyed to a flywheel type pulley 112 which is statically balanced due to drillings and the geometrically balanced input shaft remains balanced after assembly.

It will be understood that power is delivered to the pulley 112 via a belt from a tractor power source or the like as well known to those skilled in the art.

The journal 60 provides an external pivot surface 113 for an arm 114 of a coupler yoke 115. The yoke 115 FIG. 1 has an arm 116 pivoted on an extension shaft 117 secured in a boss 118 on cover plate 46 coaxial with journal 60 whereby the entire mower is capable of pivoting about a horizontal axis X—X.

What is claimed is:

1. In a mower of the type comprising a mower bar and a sickle reciprocal thereon, a housing mounted on said mower bar, a substantially horizontal input shaft mounted by the housing for rotation on an axis extending transversely of the line of reciprocation of the sickle, a vertical output shaft having a lower end at one side of said line, an arm connected to said lower end of the output shaft and swingable in an arc in a generally horizontal plane and extending from said output shaft and terminating in a distal end portion over an adjacent end of the sickle, means pivotally connecting said distal end of the arm to said adjacent end of the sickle, swash plate means, means pivotally mounting said swash plate means on the output shaft on an axis extending transversely of the axis of rotation of the input shaft, a swash plate coupling assembly connected to said input shaft for rotation therewith and clampingly embracing said swash plate means for angulating the same to effect oscillation of the output shaft, said swash plate means and swash plate coupling assembly having relative sliding movement transversely of the axis of rotation of the input shaft, said swash plate coupling assembly comprising an integral flange on said input shaft having a thrust face disposed at a non-normal angle to the axis of rotation of the input shaft, and a plate element spaced axially of the input shaft and opposing said thrust face and providing a thrust surface parallel with said face, and means connecting said plate element with said input shaft.

2. The invention according to claim 1 and said input shaft having an end portion externally of the housing, and a flywheel pulley connected to said last-mentioned end portion of said input shaft.

3. The invention according to claim 2 and a thrust bearing interposed between said swash plate means and said flange and between said swash plate means and plate element.

4. The invention according to claim 3 and said means for connecting said plate element with said input shaft being adjustable to vary the compacting load of said flange and plate element against said swash plate means and thrust bearings and the clearance therebetween to effect said sliding movement.

5. The invention according to claim 1 and said means pivotally mounting said swash plate means on the output shaft comprising a yoke having a pair of laterally spaced arms connected to the output shaft and receiving said input shaft therebetween, a trunnion pivotally mounted on each arm for pivotal movement on said axis transversely of said input shaft, and means mounting said swash plate means to said trunnions for adjustment thereof transversely of said surface and face.

6. The invention according to claim 5 and said mounting means comprising individual connections between said swash plate means and respective trunnions.

7. The invention according to claim 6 and said swash plate coupling assembly comprising an integral shoulder on said input shaft having a thrust face disposed at a non-normal angle to the axis of rotation of said input shaft, and a reaction element spaced axially of the thrust face and providing a thrust surface in opposition thereto, and means adjustably connecting said reaction element with said input shaft for positioning said reaction element selected distances with respect to said thrust face.

8. The invention according to claim 7 and a rotary flywheel member connected to the input shaft.

9. The invention according to claim 8 and said rotary flywheel member located at one end of the input shaft externally of the housing and said swash plate coupling assembly located at the other end of the input shaft within said housing.

* * * * *